US012621919B2

(12) United States Patent
Link et al.

(10) Patent No.: US 12,621,919 B2
(45) Date of Patent: May 5, 2026

(54) SHORT PULSE X-RAY GENERATOR

(71) Applicant: Fisica, Inc., San Leandro, CA (US)

(72) Inventors: Norman Link, San Leandro, CA (US); Glenn James, San Leandro, CA (US); Yoko Kawai Parker, San Leandro, CA (US); Alannah Myers, San Leandro, CA (US); Chris Ferguson, San Leandro, CA (US)

(73) Assignee: Fisica, Inc., San Leandro, CA (US)

( * ) Notice: Subject to any disclaimer, the term of this patent is extended or adjusted under 35 U.S.C. 154(b) by 156 days.

(21) Appl. No.: 18/810,836

(22) Filed: Aug. 21, 2024

(65) Prior Publication Data

US 2026/0059639 A1 Feb. 26, 2026

(51) Int. Cl.
*H05G 1/32* (2006.01)

(52) U.S. Cl.
CPC .................................... *H05G 1/32* (2013.01)

(58) Field of Classification Search
CPC .. H05G 1/00; H05G 1/10; H05G 1/20; H05G 1/22; H05G 1/24; H03K 3/53; H03K 3/537; H01R 12/00; H01R 24/00; H01R 31/00; H01J 35/00
See application file for complete search history.

(56) References Cited

U.S. PATENT DOCUMENTS 5,008,912 A * 4/1991 Farrall ................ H05K 9/0064 378/194

FOREIGN PATENT DOCUMENTS

| | | |
|---|---|---|
| CN | 104144551 | 11/2014 |
| EP | 4120805 | 1/2023 |
| KR | 20130049644 | 5/2013 |

* cited by examiner

*Primary Examiner* — Courtney D Thomas
(74) *Attorney, Agent, or Firm* — Fox Rothschild LLP; Carol E. Thorstad-Forsyth

(57) ABSTRACT

Systems and methods for generating X-rays. The systems comprise: a voltage generator configured to generate a waveform comprising a plurality of pulses; a plurality of X-ray tubes that are each configured to emit pulses of X-rays responsive to the waveform; and a plurality of connectors that are each configured to be coupled to the voltage generator and communicate the waveform from the voltage generator to the X-ray tube. A dose and/or voltage of the pulses of X-rays is/are tunable in the field by adjusting at least one of (i) a line impedance of the system via an interchange of a first connector with another second connector of the plurality of connectors and (ii) a load impedance of the system via an interchange of a first X-ray tube with another second X-ray tube of the plurality of X-ray tubes.

27 Claims, 19 Drawing Sheets

Actual data taken from 150kV SXG pulser system

What: Pulse width Correction and Peak Voltage Estimate

Setup: B tube Data, 150kV, 2.5" From AK implies Cap Mon Signal is 2x0.208ns=0.42ns too wide. Actual width 1.3ns FWHM Step implies 240kV peak with tube impedance near 800 Ohms 1. 4.3/2.7=1.6 implies 150kV*1.6= 240kV at A-K
2. 1.6 Gain implies a tube impedance of 800 Ohms (Cross-Sectional)

SHORT PULSE X-RAY GENERATOR

BACKGROUND

Description of the Related Art

With X-ray imaging, there is often a trade-off where one either needs higher amounts of penetration using a high energy X-rays, or better contrast which requires more X-ray dose during the same mission. These two goals have traditionally required separate sources.

SUMMARY

The present disclosure concerns implementing systems and methods for generating X-rays. The systems comprise: a voltage source generator configured to generate a waveform comprising a plurality of pulses; a plurality of X-ray tubes that are each configured to emit pulses of X-rays responsive to the applied voltage waveform; and at least one connector that is configured to be coupled to the voltage generator and communicate the waveform from the voltage generator to the X-ray tube. The trade-off of a dose versus the X-ray voltage of the pulses is tunable in the field by adjusting the load impedance of the system via an interchange of a first X-ray tube with another second X-ray tube of the plurality of X-ray tubes.

The methods comprise: generating a waveform comprising one or more pulses by a voltage generator; communicating the waveform to an X-ray tube via a connector having a first impedance; emitting pulses of X-rays from the X-ray tube having a second impedance, responsive to the waveform; and tuning a dose or a voltage of the pulses of X-rays by adjusting the first or second impedances via the connector with another connector or an interchange of the X-ray tube with another X-ray tube.

BRIEF DESCRIPTION OF THE DRAWINGS

The present solution will be described with reference to the following drawing figures, in which like numerals represent like items throughout the figures.

DETAILED DESCRIPTION

Figure 1:
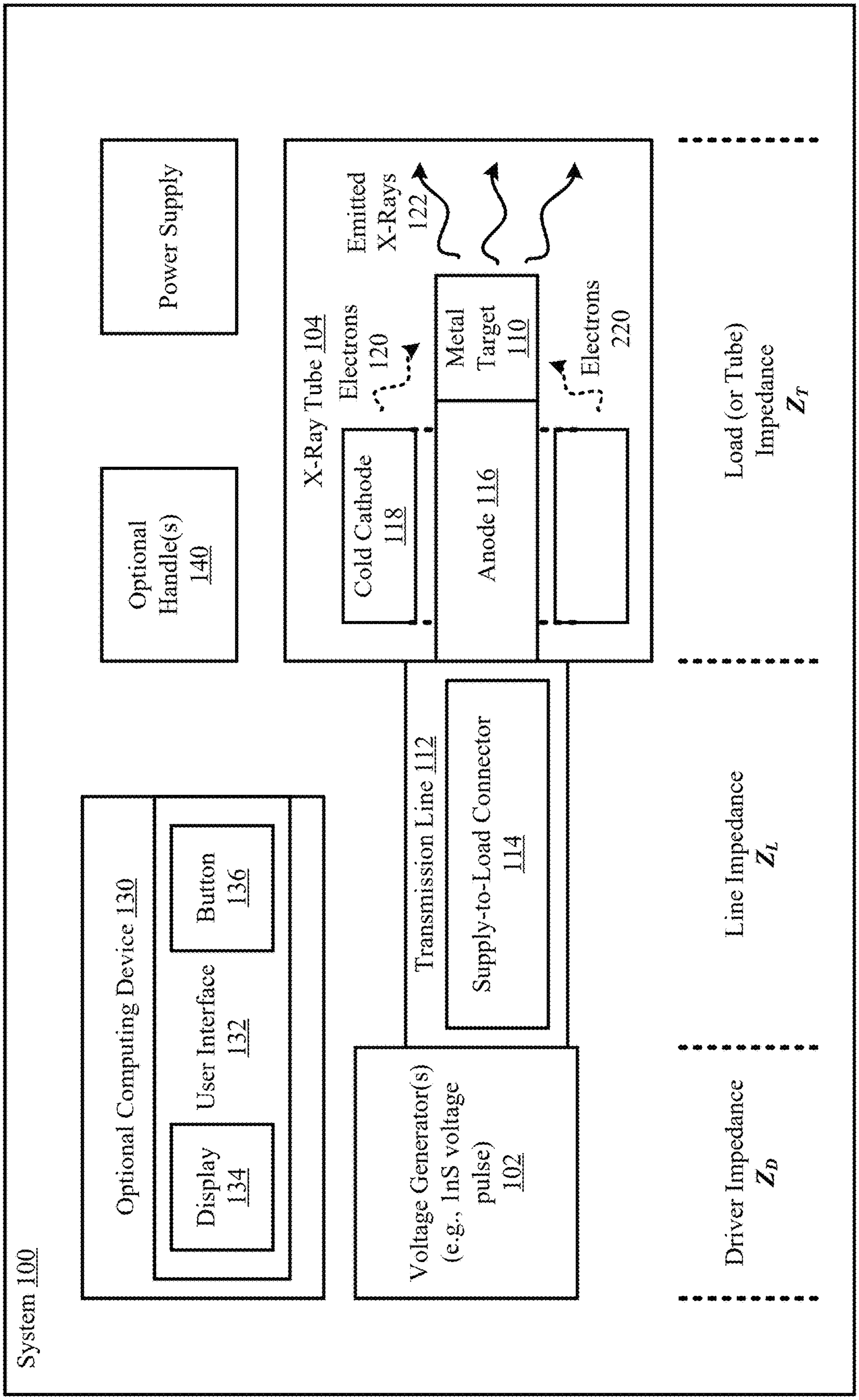
FIG. 1 provides an illustration of a system implementing the present solution.

With X-ray imaging, there is a tradeoff between the need for higher penetration using a higher energy X-rays, or better contrast which requires more X-ray dose during the same mission. Conventionally, these two goals require different sources. The present document concerns solutions in which one X-ray source can be used to achieve either goal. The present X-ray source is configured to: provide a more energy efficient generation of X-rays (which may allow for superior battery operation); work with shorter, more robust X-ray tubes that hold up to field use; have almost no high voltage components thus leading to cooler running and longer mean time to failure (MTTF).

Conventional solutions use relatively long voltage pulses (on the order of 30+ ns) with limited operating range as determined by the fixed impedance of the driver, a load impedance that determines or fixes X-ray voltage and dose, and spiral wound generators which have a relatively limited voltage range. Standard practice is to match the load and supply impedances which optimizes the power or energy transfer to the load but fixes the output (X-ray) voltage. Spiral generators tend to run hot and need regular cooling off periods which increases the required time on target and poor battery life. If a spiral generator will not work, (usually due to a need for higher voltages), then it becomes necessary to use very dangerous radioisotopes such as iridium-192 (~460 keV) and cobalt-60 (~1.25 keV).

By combining a relatively short voltage pulse (~1 ns) and a cold cathode X-ray tube, it is possible to tune the resulting X-ray to either be higher voltage or higher dose. It should be noted that conventional pulses are 25 ns or 70 ns. This new and novel approach allows user selected tradeoffs for one voltage generator to be used on a variety of X-ray imaging missions.

The present solution implements the following concept(s): (i) transmission line tuned dose and voltage; (ii) improved cold cathode X-ray tube; (iii) building block X-ray pulser, and/or (iv) an innovative, high voltage, short pulse, generator-to-tube interface. Each of these concepts (i)-(iv) will be discussed in detail below. However, with regard to concept (i), it should be noted, by sending a relatively short voltage pulse into a tuned transmission line, the user can trade off the resulting X-ray's voltage for dose. With regard to concept (ii), it should be noted that the relatively short voltage pulse allows for several refinements to the cold cathode X-ray tube.

With regard to concept (iii), it should be noted that it may be possible to build 150 kV generators as modules such that they can be stacked together to create higher voltage systems. With regard to concept (iv), it should be noted that the system comprises an interface between the voltage generator and the X-ray tube that is designed to address the relatively short pulse and impedance mismatch therebetween.

The present solution can be used in various applications. Such applications can include, but are not limited to, imaging equipment applications, security applications, airport luggage scanner applications, industrial inspection applications, and/or X-ray analysis equipment.

FIG. 1 provides an illustration of a system 100 implementing the present solution. System 100 is configured to produce X-rays using a cold cathode X-ray tube 104. In this regard, system 100 comprises voltage generator(s) 102 configured to supply a voltage signal to the X-ray tube 104 to facilitate production of X-rays. Voltage generator(s) may be referred to a sputter voltage generator and/or a flash voltage generator. The sputter voltage generator may be configured to generate a waveform with pulses of equal to or less than, for example, 5-20 ns, while the flash voltage source may be configured to generate flashes or flash waveforms of equal to less than, for example, 60-100 ns. The present solution will be discussed herein in relation to the sputter voltage generator. However, the present solution is not limited in this regard. The interchangeable parts of system 100 can also be used with the flash voltage generator. The particulars of the interchangeable parts will become evident as the discussion progresses.

System 100 may be a portable device, and therefore optionally comprise one or more optional handles 140. A computing device 130 may be provided to facilitate control of system 100. The computing device 130 may include, but is not limited to, a user interface 132 configured to allow user-software interactions for controlling operations of system 100. The user interface 132 can include, but is not limited to, a display 134 and button(s) 136. Operations of system 100 that can be controlled will become evident as the discussion progresses.

During operations, voltage generator(s) 102 produce(s) a pulsed voltage signal. The pulses of the voltage signal are relatively short as compared to those of conventional X-ray sources. For example, in some scenarios, the pulses are approximately one nano-second long.

The pulsed voltage signal is applied between an anode 116 and a cathode 118 of a X-ray tube 104 via a transmission line 112. The positive terminal of the voltage generator(s) 102 is connected to the anode 116, while the negative terminal of the voltage generator(s) 102 is connected to the cold cathode 118. Transmission line 112 includes a supply-to-load connector 114 which will be discussed in detail below. Application of the pulsed voltage signal causes electrons 120 to eminate from the cathode 118 and subsequently strike the metal target 110 of the anode which results in the creation of X-rays 122. Metal target 110 may include, but is not limited to, tungsten.

System 100 is designed to allow for a transmission line tuned X-ray dose and voltage. In this regard, it should be noted that the supply-to-load connector 114 of the transmission line 112 acts as a transformer of the voltage passing from the voltage generator(s) 102 to the X-ray tube 104. An interesting phenomenon occurs if the voltage generator 102 supplies a pulse with a width shorter in time than the transit time across the supply-to-load connector 114. In this case, the supply-to-load connector 114 is treated as a transmission line 112 with its own impedance $Z_L$. During the time of the short pulse, the voltage generator 102 only sees the transmission line impedance $Z_L$ as a load and the X-ray tube 104 only sees the transmission line impedance $Z_L$ as a source. In this situation, the pulse arrives at the X-ray tube 104 (which sees an impedance $Z_T$ larger than the transmission line impedance $Z_L$) and a voltage gain (which is determined by the mismatch of these two impedances) occurs as the forward and reflected pulses overlap at the site of the impedance mismatch. If at that moment the X-ray tube 104 begins to close, the X-ray tube 104 will see the voltage gain driving it to closure.

Different X-ray tube impedances $Z_T$ and different line impedances $Z_L$ may be selectively combined to adjust the dose rate or the X-ray voltage (keV) of the delivered pulses. Features of the voltage generator 102, supply-to-load connector 114 and X-ray tube 104 may be manipulated to change the characteristics of the resulting X-rays 122. The pulse width should be shorter relative to the length of the transmission line 112 connecting the voltage generator(s) 102 to the X-ray tube 104. The relative line impedance $Z_L$ versus load impedance $Z_T$ determines the delivered dose rate and X-ray voltages (KeV).

Figure 2:
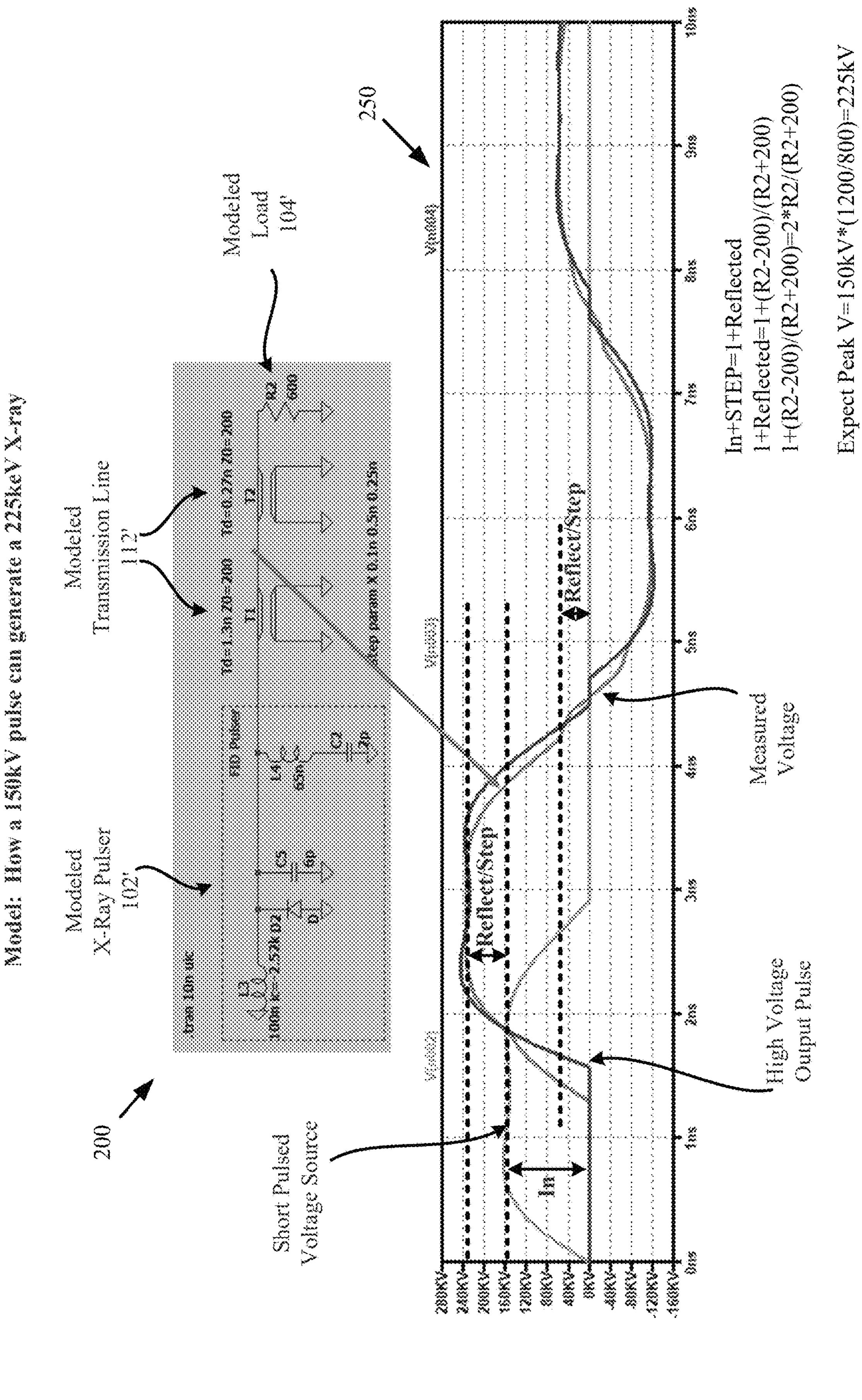
FIG. 2 provides an illustration of a model of the system shown in FIG. 1 and simulation results.

A model of system 100 was created and operations thereof were simulated. As shown in FIG. 2, the model 200 comprises a modeled X-ray pulser 102', a model transmission line 112', and a modeled load 104'. Results from simulation of the model 200 are shown in graph 250 of FIG. 2. The simulation shows how a relatively short-pulsed voltage generator (e.g., 150 kV) can be used to generate a relatively higher output X-ray pulse (e.g., 225 keV). Measuring a voltage at the X-ray tube (represented by resistor R2 in model 200) is difficult. So, the measurement was alternatively made at the transmission line.

Figure 3:
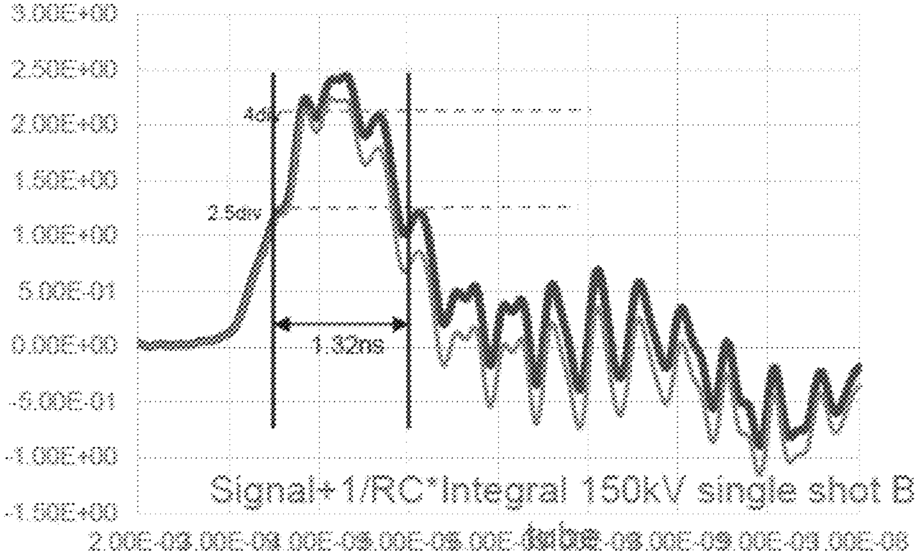
FIG. 3 provides a graph showing actual data taken from a 150 kV SXG pulser system.

FIG. 3 provide a graph 300 showing actual data taken from a 150 kV SXG pulser system. The actual data confirms the approximate pulse width correction and peak voltage estimate.

Figure 4A:
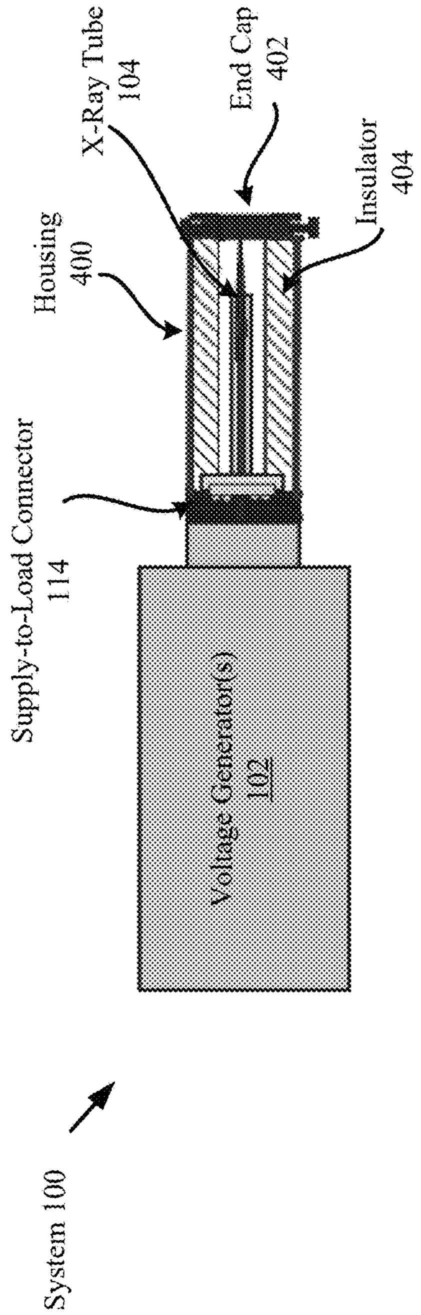
FIGS. 4A-4C (collectively referred to as "FIG. 4") provide illustrations that are useful for understanding the part modularity and/or interchangeability of the system shown in FIG. 1.
Figure 4B:
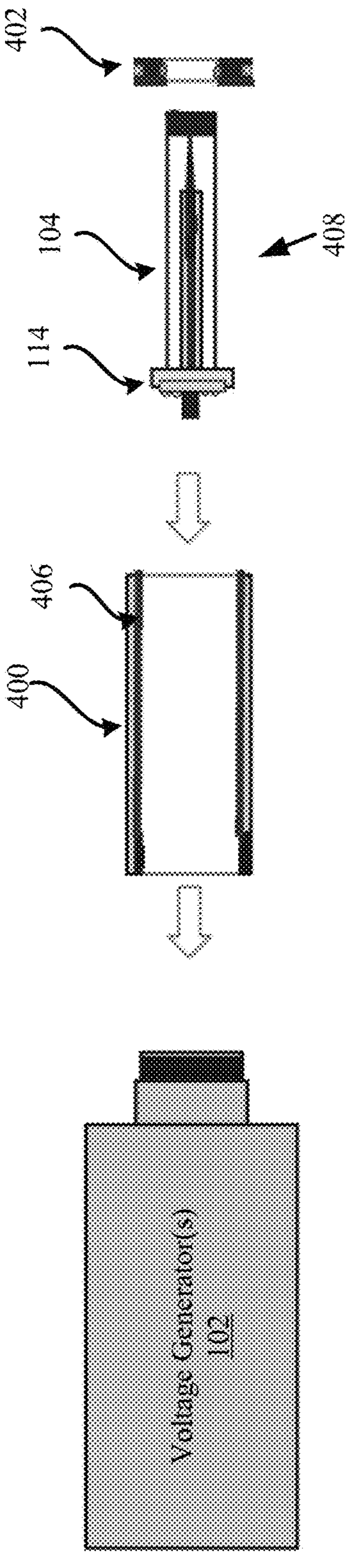

FIGS. 4A-4B provide illustrations that are useful for understanding the part modularity and/or interchangeability of system 100. When system 100 is in its assembled state shown in FIG. 4A, the voltage generator(s) 102 is(are) coupled to the X-ray tube, 104, via voltage generator-to-X-ray tube connector. The voltage generator-to-X-ray tube connector, here on referred to as the connector, is comprised of 114, 400, 402, and 404. Part 104, is disposed in the connector housing 400 and attached, electrically and mechanically, to the voltage generator, 102, via connector item 114. The connector end cap, 402, completes the electrical and mechanical connection between the connector housing, 400, and the X-ray tube, 104. An insulator 404 is disposed around the X-ray tube 104 within the connector housing 400. The insulator 404 can include, but is not limited to, liquid or solid electrically insulating material including anodization or other coatings involving the chemical reactions of conductive surfaces or conformal coatings. The insulator 404 is provided to facilitate (i) an internal ionization control for optimal operation of system 100.

Part 114 of the connector is a modular component to allow for one or more voltage generator modules to be selectively added to and removed from system 100. For example, if a 150 kV source is desired, then a single voltage generator module may be used. In contrast, if a 225 kV or 300 kV is required, then two voltage generator modules may be used. Note that KeV is the voltage of the X-rays which is different than KV which refers to the voltage that will drive the system. The present solution is not limited to the particulars of this example.

Part 104, the X-ray tube, is exchangeable with other tubes. As such, system 100 may comprise a plurality of different X-ray tubes 104. The plurality of different X-ray tubes 104 are designed such that different X-ray energies and fluences are produced by system 100. In addition when different connectors, parts 400, 114, 402 and/or 404 being utilized, the range of the afore noted X-ray parameters is expanded. By configuring X-ray tube, 104, to provide different impedances $Z_T$ and/or configuring the connector, items 114, 400, 402, and 404, to provide different line impedances $Z_L$, X-rays emitted from system 100 may be tuned. For example, up to at least 260 keV, or greater, X-ray energies can be delivered based on a 150 kV voltage pulse or, by alternative X-ray tube and connector selection, a maximum fluence of 150 keV X-rays can be produced. Also, different X-ray tube, item 104, anode and/or cathode configurations may be provided to facilitate different shapes of emitted X-rays (e.g., a ring or annular of emitted X-rays or a dot of emitted X-rays).

The user can select which X-ray tube and connector to use at any given time and interchange the components in the field. Accordingly, system 100 is designed to allow the connector, an assembly of items 114, 400, 402 and 404, to be decoupled from and recoupled to the voltage generator(s) 102.

Figure 4C:
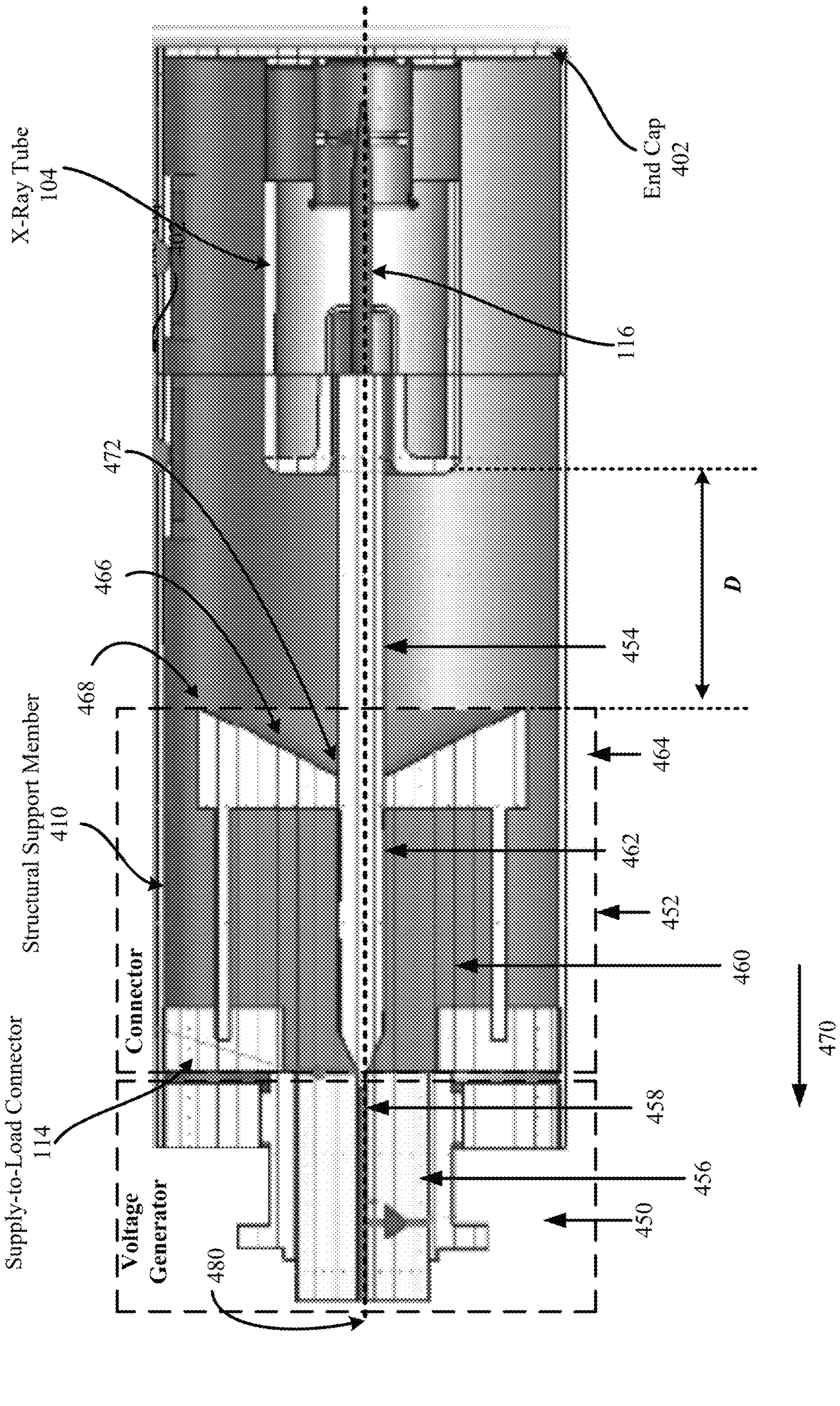

A more detailed illustration of the connector and X-ray tube assembly 408 is provided in FIG. 4C. In this detailed illustration, items 460, 454, 462, comprise item 114, the voltage generator to tube flange.

Connector 114 has a novel design to address the impedance mismatch between the voltage generator(s) 102 and the X-ray tube 104. A different connector may be used for different possible voltage of the modular voltage generator. For example, a first connector is used when the total number of voltage generator modules are being used to provide a 150 keV voltage generator, and a second, different connector may be used when a different total number of voltage generator modules are being used to provide a 300 kV voltage generator. The present solution is not limited to the particulars of this example.

Connector 114 comprises a proximal end member 450, a distal end member 452, and an elongate conductive member 454 extending through both end members 450, 452. The proximal end member 450 is sized and shaped to facilitate an electrical connection between the voltage generator(s) 102 and connector 114. The design of the outer surface profile of the proximal end member 450 may change depending on how many voltage generator modules that are to be used to provide the waveform to the X-ray tube 104.

The proximal end member 450 comprises a conductive material 456 that encompasses a proximal end 458 of the elongate conductive member 454. The elongate conductive member 454 may include the same or different conductive material as feature 458.

This material can include, but is not limited to, steel and/or aluminum. The waveform generated by the voltage generator(s) 102 is communicated to the X-ray tube 104 via the elongate conductive member 454. Accordingly, the waveform travels through the elongate conductive member 454 from the voltage generator(s) 102 to the anode 116 of the X-ray tube 104. The center axes 480 of components 450, 454, 452 may be aligned with each other.

The elongate conductive member 454 may have a cross-sectional profile with a varying diameter or width. The diameter of proximal end 458 of the elongate conductive member 454 is smaller than the diameter of the remaining portion of the elongate conductive member 454.

The connector, comprises of items 114, 400, 402 and 404, is configured to (i) provide a particular line impedance $Z_L$ and (ii) prevent formation of an electrical conduction between the anode 454 and connector housing 410. With regard to feature (i), an electrical resistive material 460 is provided that encompasses an intermediary portion 462 of the elongate conductive member 454 passing through the distal end member 452. The electrical resistive material 460 can include, but is not limited to, a silicone material which has the following minimal properties: bulk, >1 $cm^3$, breakdown properties of >300 kV/inch, and resistivity, including surface resistivity, of $>2\times10^3$ Ohm-cm.

With regard to feature (ii), a shaped end piece on insulator shown as item 460 attached to 468 is designed to allow for a minimized distance D between the connector 114, the X-ray tube 104, and the connector housing 410, while ensuring that electrical discharge between connector components 114, 400, 402, and 400, and/or the X-ray tube 104 does not reduce the energy delivered to the X-ray tube. Accordingly, piece 468 is shown, for illustration purpose, as having an angled surface which faces the X-ray tube 104. Also, this external shaped surface 468 is shown, again for illustrative purposes, as being angled to the surface of the anode rod. The external shape of this surface may also be concave, curved and/or shaped in any fashion, such as the angle shown, that resists electrical discharge. The edges of the metal surfaces, such as 454, follow common high voltage practices of smoothing or rounding, to eliminate any sharpness or other electric field enhancements. The shape and size of the external shaped insulator surface is selected to allow for minimization of distance D. The minimized distance is a variable distance that involves all of the connector components, 114, 400, 402, and 404, and is influenced by the desired connector impedance as well as transmission line transit times within the connector.

X-ray tube 104 of system 100 comprises a novel design to improve the characteristics of the X-rays that are emitted from the cold cathode X-ray tube. Illustrative architectures 500, 600, 700, 800, 900, 1000, 1100 for the cold cathode X-ray tube are shown in FIGS. 5A-11B. It should be noted that architectures 500, 600, 700, 800, 900, 1000, 1100 may have the same or similar overall geometric size and able to be used with different kiloelectron volt sources (e.g., a 150 keV voltage source, a 250 keV voltage source and/or a 450 keV voltage source). The X-ray tube 104 also does not require cooling when fired with short voltage bursts, unlike the conventional portable X-ray generators which typically require multiple minutes to cool after every short stints of operation.

Figure 5A:
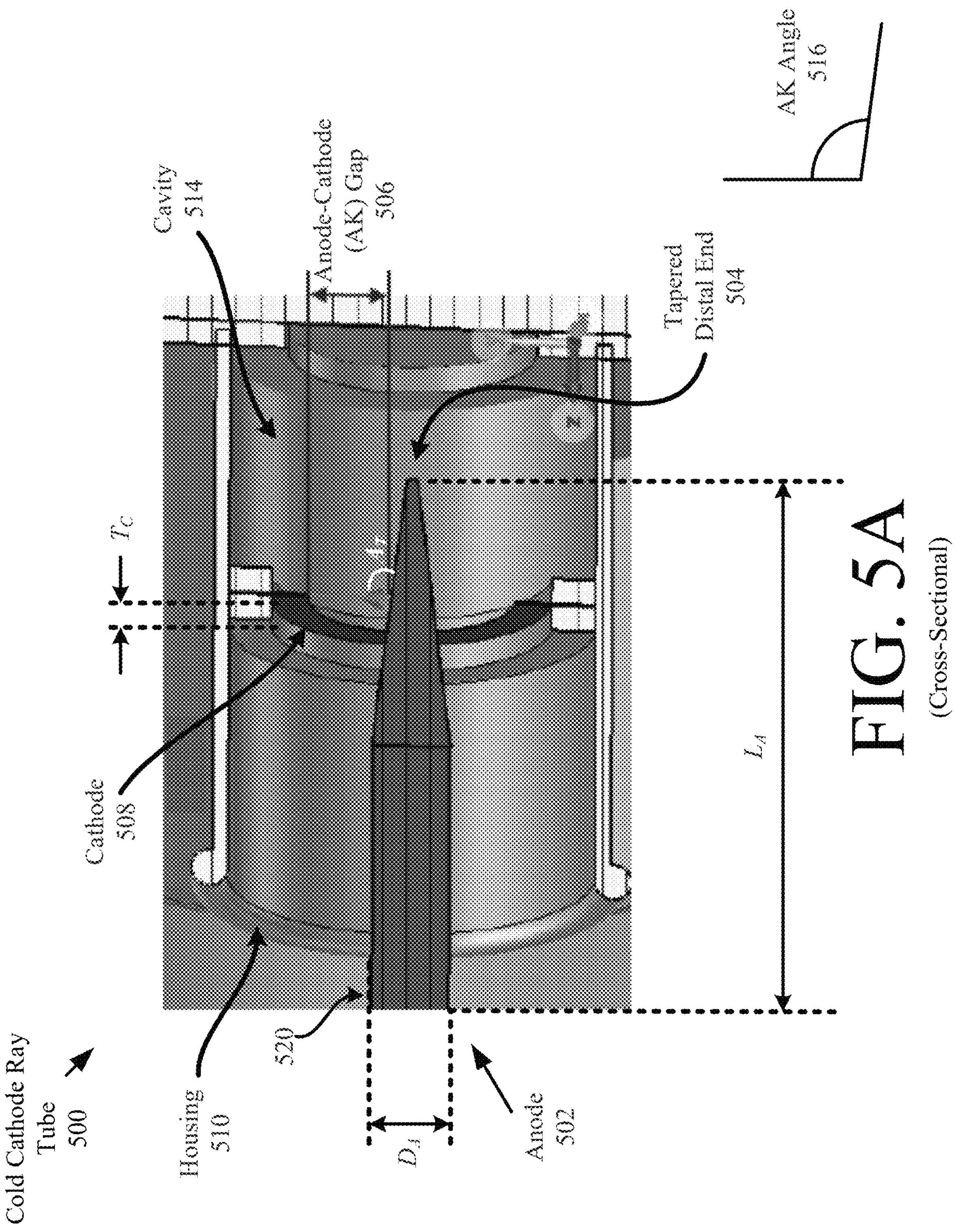
FIGS. 5A-11B provide illustrations of various architectures for the cold cathode X-ray tube are shown in FIGS. 1 and 4.
Figure 5B:
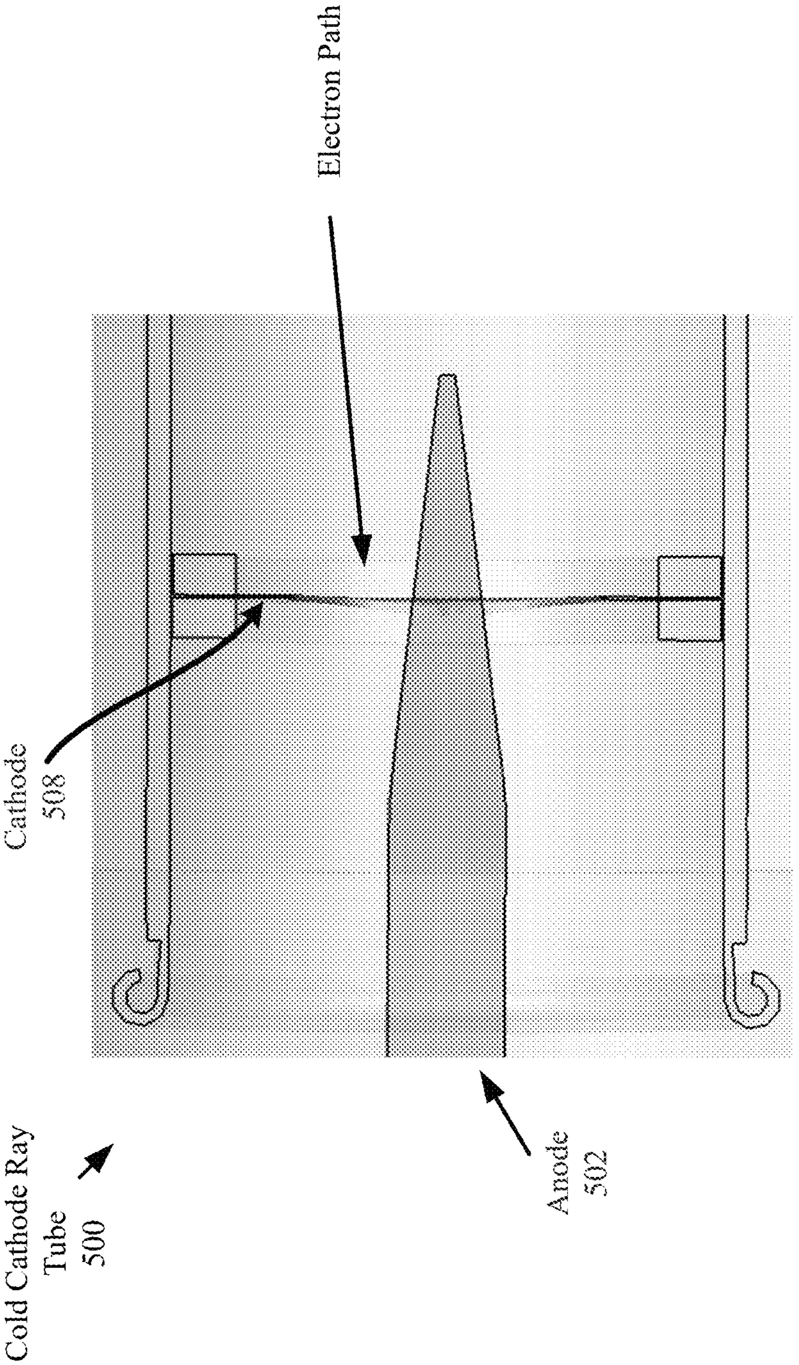
Figure 6:
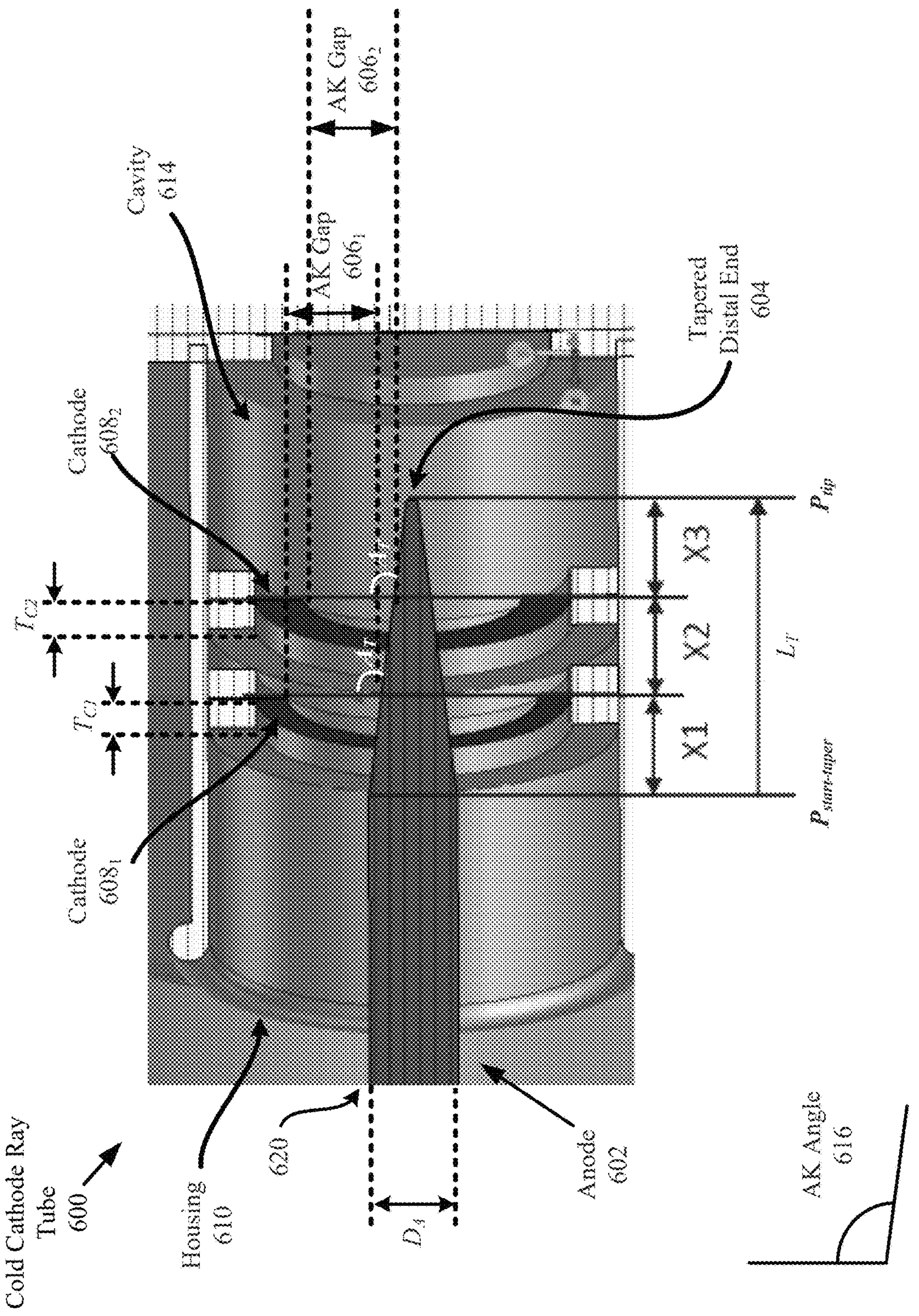
Figure 7:
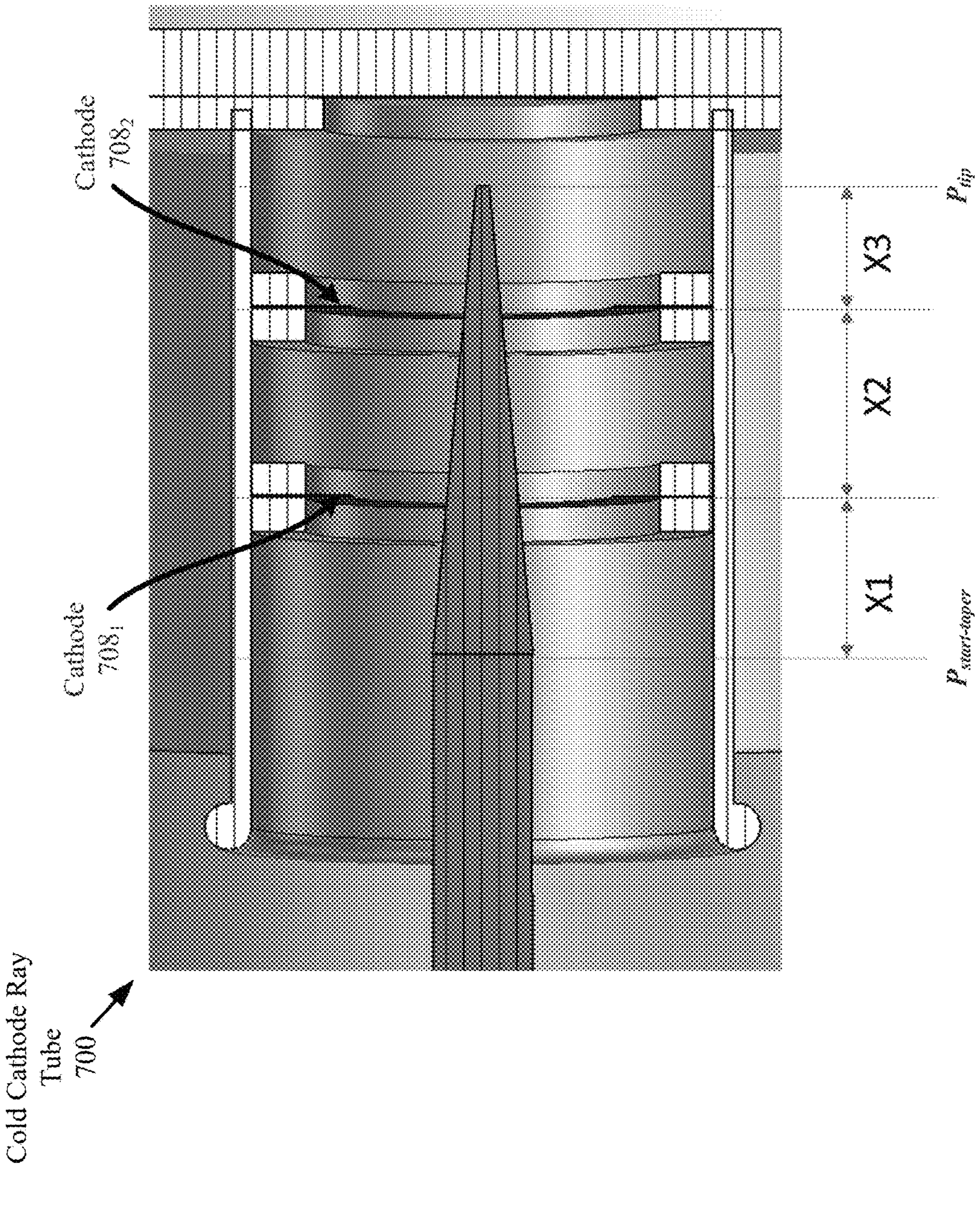
Figure 8:
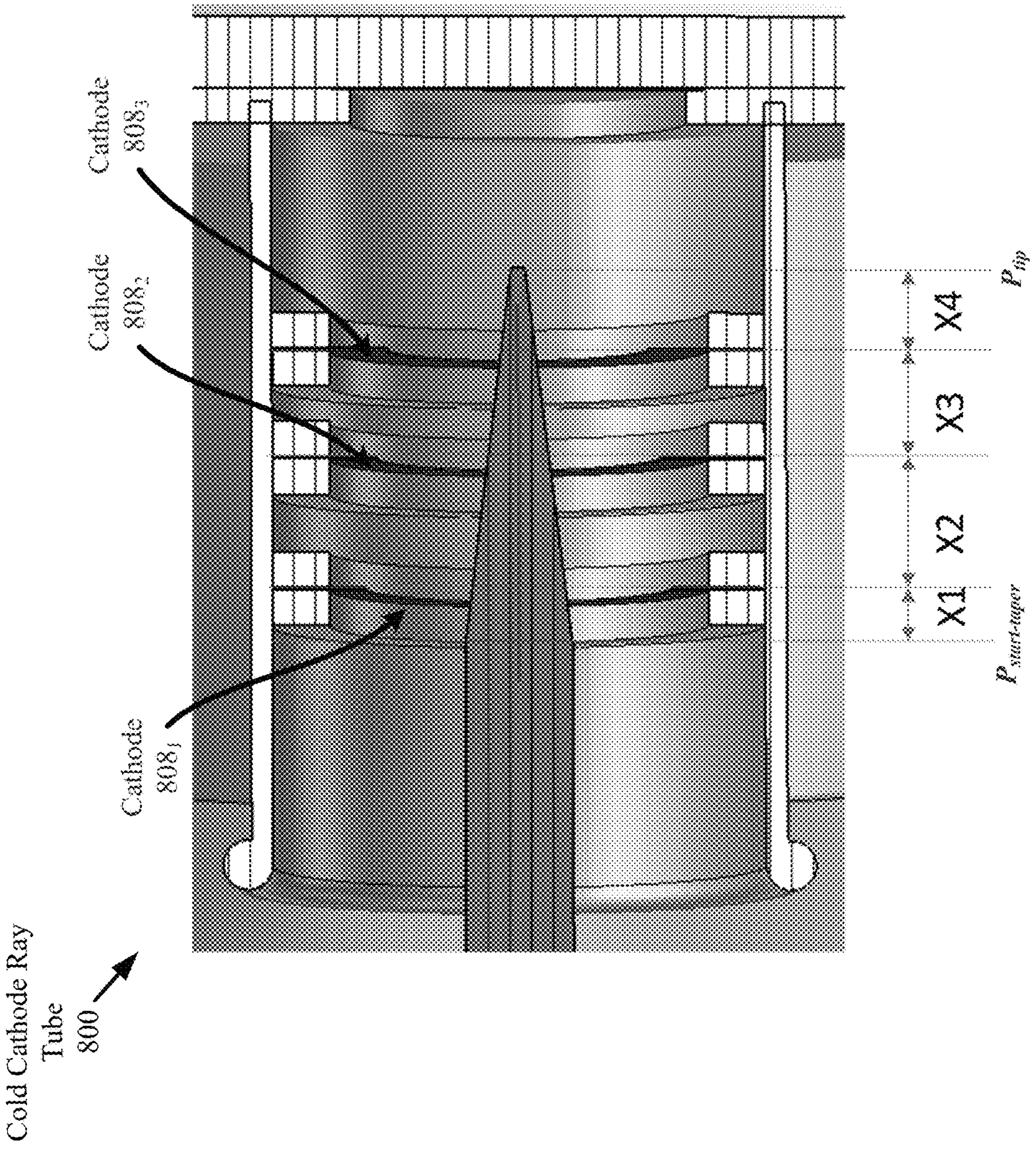
Figure 10A:
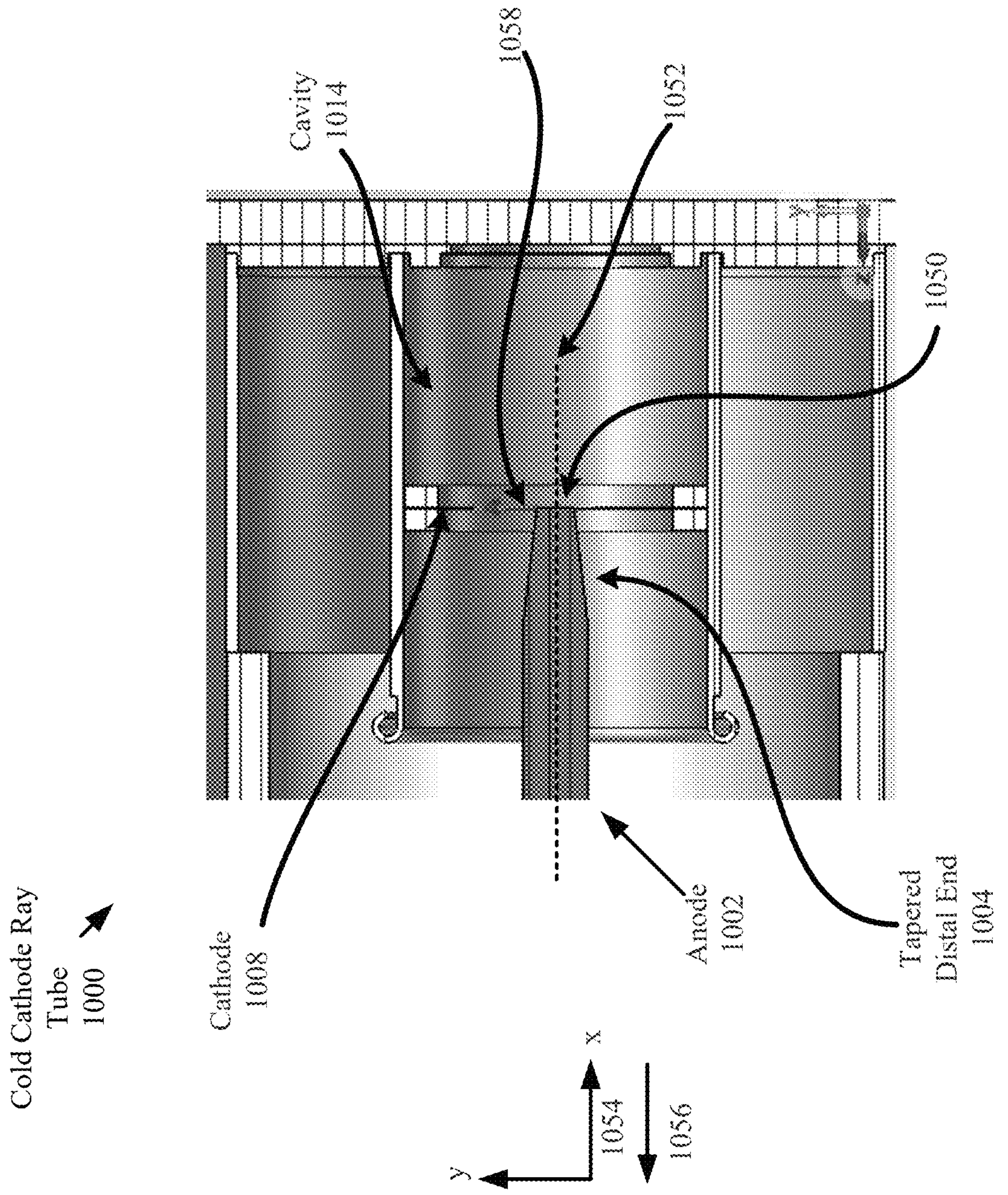
Figure 10B:
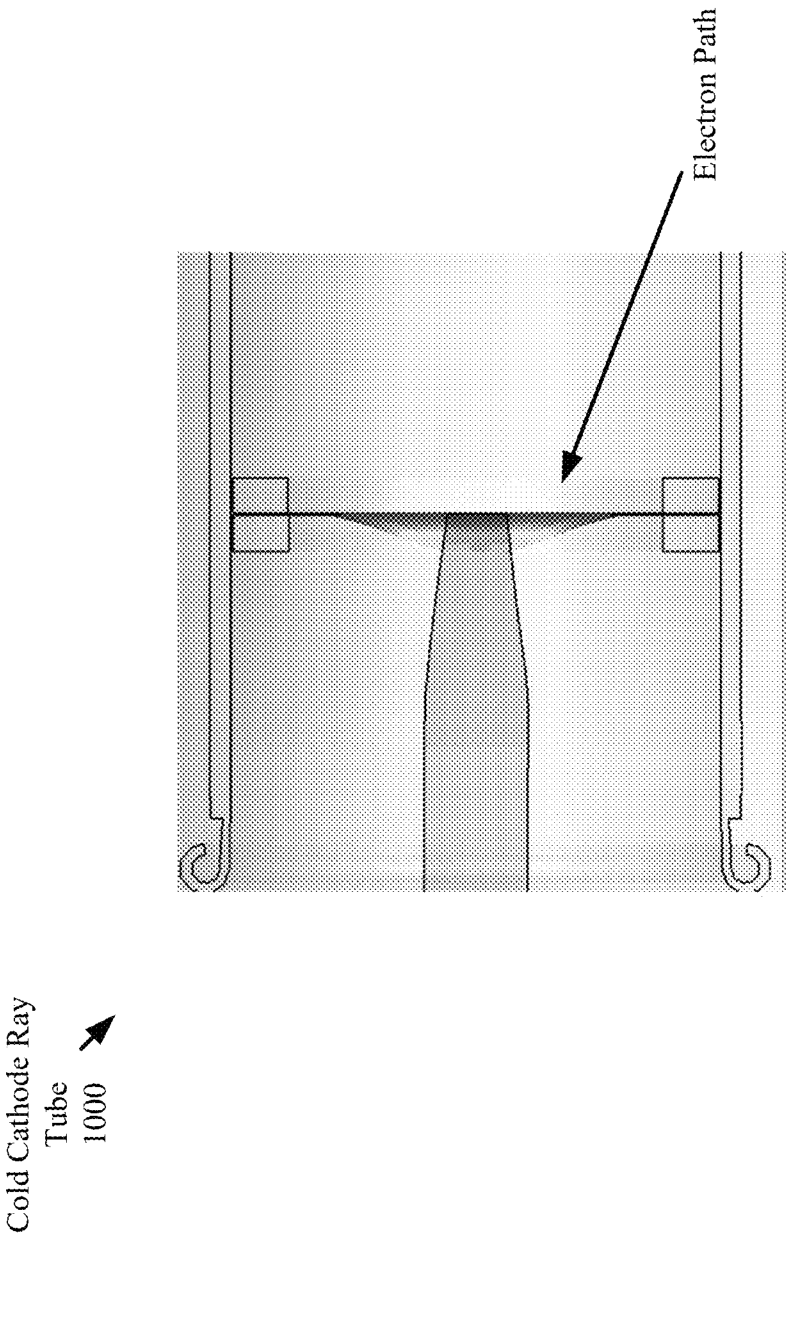
Figure 11A:
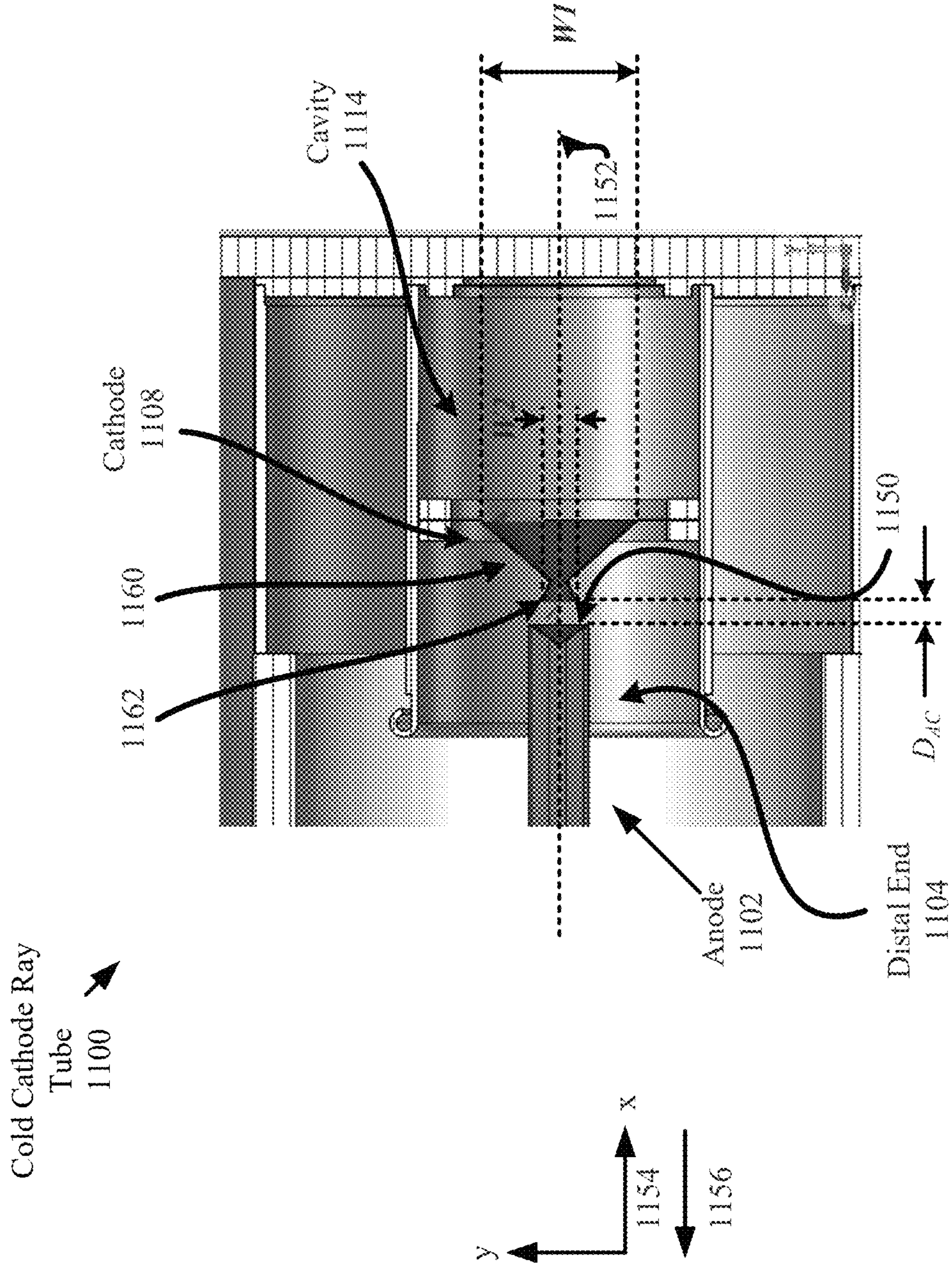
Figure 11B:
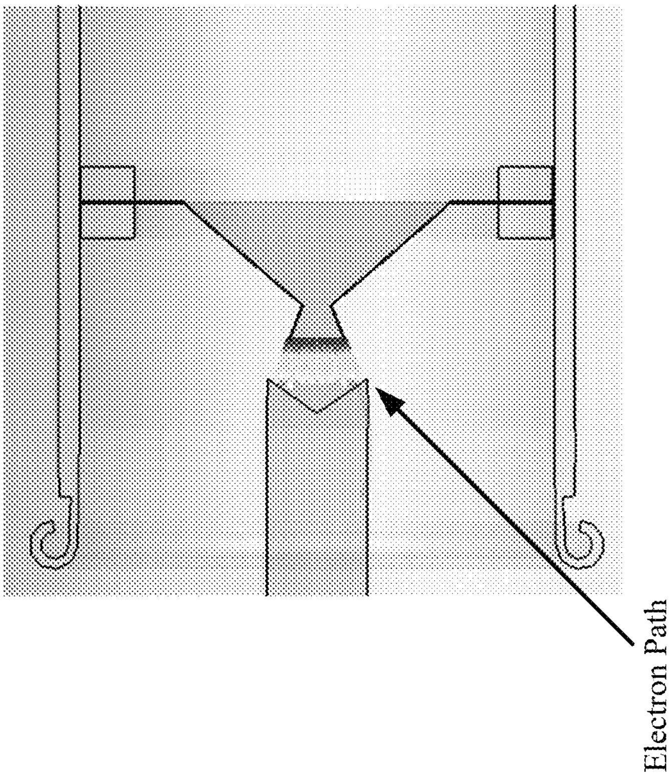

X-ray tube 104 may be the same as or similar to cold cathode X-ray tube 400 of FIGS. 4A-4B (collectively referred to as "FIG. 4"), 500 of FIGS. 5A-5B (collectively referred to as "FIG. 5"), 600 of FIGS. 6, 700 of FIGS. 7, 800 of FIGS. 8, 1000 of FIGS. 10A-10B (collectively referred to as "FIG. 10"), and/or 1100 of FIGS. 11A-11B (collectively referred to as "FIG. 11"). Thus, the discussion of cold cathode X-ray tube 500, 600, 700, 800, 900, 1000, 1100 is sufficient for understanding X-ray tube 104 of FIG. 1.

As shown in FIG. 5A, the cold cathode X-ray tube 500 comprises a housing 510 with an internal cavity 514. A cathode 508 and a portion of an anode 502 are disposed in cavity 514. Each of these listed components 502, 508, 510 may comprise any material selected in accordance with a given application. For example, the housing material(s) can include, but is(are) not limited to, glass and/or ceramic. The anode material(s) can include, but is(are) not limited to, tungsten. The anode 502 has an elongate circular body 520 with diameter $D_A$ and a tapered distal end 504. The cathode 508 comprises a ring cathode through which the anode's tapered distal end 504 is at least partially inserted. In this way, the ring cathode 508 encompasses or otherwise extends around a portion of the anode's distal end 504. The cathode 508 is located in cavity 514 relative to the anode's distal end 504 so that a particular anode-cathode (AK) gap 506 is provided and a particular AK angle 516 is provided. The AK gap 506 and AK angle 516 can be selected in accordance with any given application. For example, the AK gap 506 may have, but is not limited to, a value between about 0.002 inches to about 0.200 inches. The cathode 508 has a thickness $T_C$. The anode diameter $D_A$, taper angle $A_T$, and material are selected in accordance with a given application. The taper angle $A_T$ may be any angle selected in accordance with a given application. In some scenarios, the taper angle $A_T$ may be zero. Similarly, the cathode's inner ring shape and thickness $T_C$ are selected in accordance with a given application. The electron path from the cathode 508 to the anode 502 are illustrated in FIG. 5B.

The present solution is not limited to the architecture shown in FIG. 5. In this regard, system 100 is configured so that the cold cathode X-ray tube 104 is a modular component that can be interchanged in the field with one or more other cold cathode ray tubes with at least one different feature. For example, the cold cathode X-ray tube 500 may be interchanged or otherwise replaced with another different cathode X-ray tube of FIGS. 6-11 for changing one or more properties of the X-rays produced by system 100. The X-ray tubes can have different anode diameters $D_A$, anode taper angles $A_T$, anode tapered shapes, anode lengths $L_A$, anode material, total number of cathodes, cathode shape, cathode size, cathode inner ring shape, cathode thickness $T_C$, AK gap, and/or AK angle.

As shown in FIG. 6, cathode X-ray tube 600 comprises a housing 610 with an internal cavity 614. Cathodes 608$_1$, 608$_2$ (collectively referred to as "cathodes 608") and a portion of an anode 602 are disposed in cavity 614. Each of these listed components 602, 608, 610 may comprise any material selected in accordance with a given application. For example, the housing material(s) can include, but is(are) not limited to, glass and/or ceramic. The anode material(s) can include, but is(are) not limited to, tungsten. The anode 602 has an elongate circular body 620 with diameter $D_A$ and a tapered distal end 604. Each cathode 608$_1$, 608$_2$ comprises a cathode through which the anode's tapered distal end 604 is at least partially inserted. In this way, each ring cathode 608$_1$, 608$_2$ encompasses or otherwise extends around a portion of the anode's tapered distal end 604. A first cathode 608$_1$ is located in cavity 614 relative to the anode's tapered distal end 604 so that a first AK gap 606$_1$ is provided and a AK angle 616 is provided. A second cathode 608$_2$ is located in cavity 614 relative to the anode's tapered distal end 604 so that a second AK gap 606$_2$ is provided and a AK angle 616 is provided. AK gaps 606$_1$ and 606$_2$ may be the same or different. Each AK gap 606$_1$, 606$_2$ may have, but is not limited to, a value between 0.005 inches to 0.16 inches. Cathode 608$_1$ has a thickness $T_{C1}$, while cathode 608$_2$ has a thickness $T_{C2}$ which may be the same as or different than $T_{C1}$ (i.e., $T_{C2}=T_{C1}$, $T_{C2}<T_{C1}$, or $T_{C2}>T_{C1}$). The tapered distal end 604 extends from point $P_{start\text{-}taper}$ to point $P_{tip}$. Thus, the length $L_T$ of the tapered distal end 604 is the sum of distances X1, X2 and X3 (i.e., $L_T$=X1+X2+X3). The anode diameter $D_A$, taper angles $A_T$, and material are selected in accordance with a given application. Similarly, the cathodes' inner ring shapes and thicknesses $T_{C1}$, $T_{C2}$ are selected in accordance with a given application.

FIG. 7 shows a cold cathode X-ray tube 700 which is similar to cold cathode X-ray tube 600 of FIG. 6, except for example the spacing between points $P_{start\text{-}taper}$, $P_{tip}$ and cathodes 708$_1$, 708$_2$. The spacing X1 between features $P_{start\text{-}taper}$ and 706$_1$ is (i) less than the spacing X2 between features 708$_1$ and 708$_2$ and (ii) greater than the spacing X3 between features 708$_2$ and $P_{tip}$. The present solution is not limited to the total number of cathodes and/or illustrative spacing of FIG. 7. Alternatively, spacing X1 may be greater than spacing X2 and less than spacing X3. Depending on the impedance, X1, X2 and X3 can have any sizes and/or spacing relative to each other given the particular application.

FIG. 8 shows a cold cathode X-ray tube 800 which is similar to cold cathode X-ray tube 600 of FIG. 6, except for example the total number of cathodes and the spacing between points $P_{start\text{-}taper}$, $P_{tip}$ and cathodes 808$_1$, 808$_2$, 808$_3$. The spacing X1 between features $P_{start\text{-}taper}$ and 808$_1$ is (i) less than the spacing X2 between features 808$_1$ and 808$_2$, (ii) less than the spacing X3 between features 808$_2$ and 808$_3$, and (iii) is less than the spacing X4 between features 808$_3$ and $P_{tip}$. The spacing X2 is greater than spacing X1, X3 and X4. Spacing X3 is greater than spacing X1 and X4, and less than spacing X2. Spacing X4 is greater than spacing X1 and less than spacing X2 and X3. The present solution is not limited to the total number of cathodes and/or illustrative spacing of FIG. 8. Depending on the impedance, X1, X2 and X3 can have any sizes and/or spacing relative to each other given the particular application.

Figure 9A:
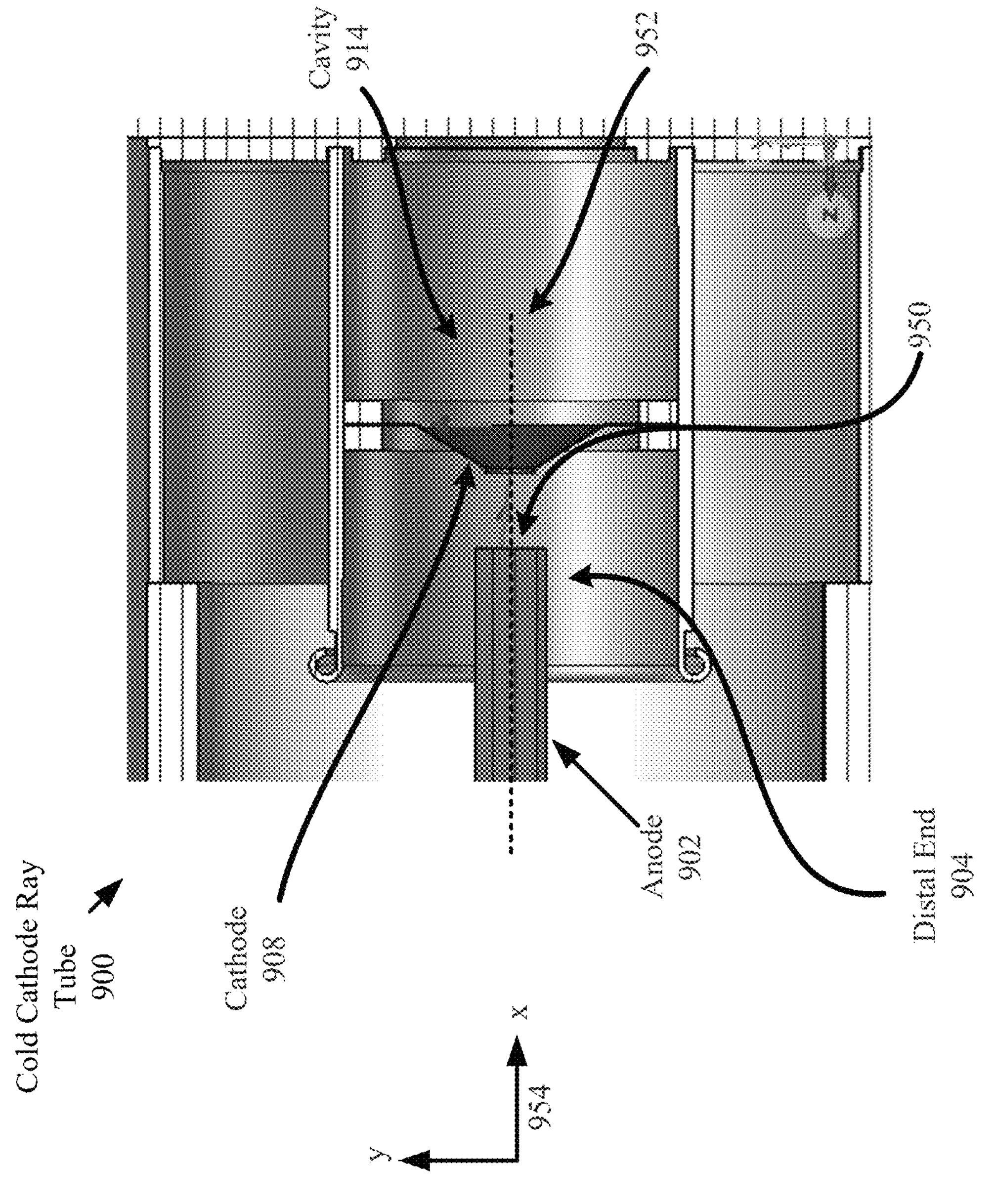
Figure 9B:
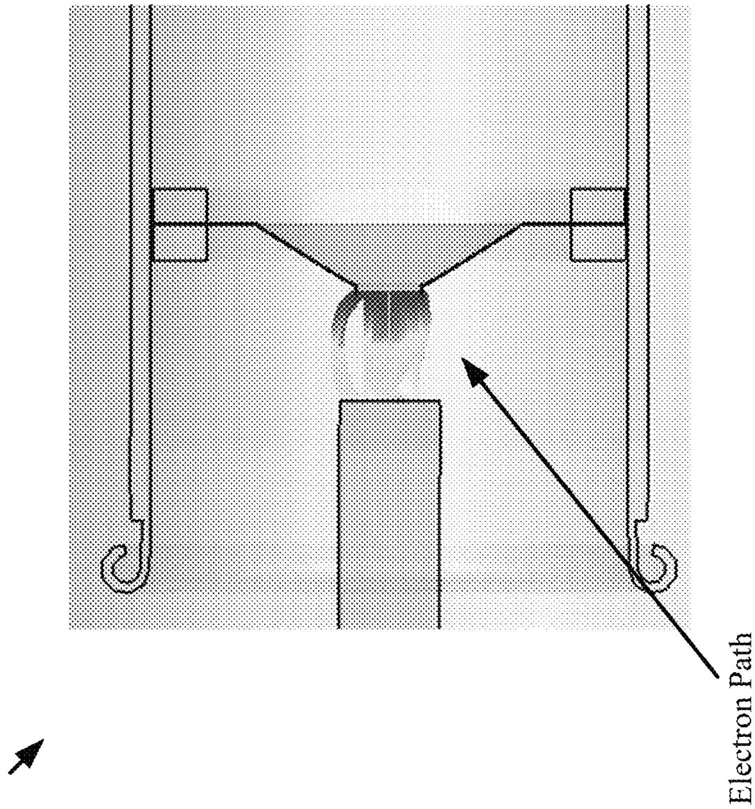

FIG. 9 shows a cold cathode X-ray tube 900 with a different architecture comprising a different shaped anode distal end 904, the different shape for the cathode 908, and a different relative position of the anode 902 and cathode 908 inside cavity 914. The distal end 904 of anode 902 may be not tapered, flat or flared (thus making a different surface at the distal end of the anode to allow for different electric fields). However, the anode's distal end is shown in FIG. 9 as being straight with a planar or flat end face 950. The central axis 952 of the anode 902 and cathode 908 are vertically aligned with each other (e.g., along the y-axis such that they have the same y-axis value), but not horizontally aligned with each other (e.g., along the x-axis such that they have different x-axis values). As such, the cathode 908 may be said to be located in front of or after the anode 902 on in a positive x-axis direction 954. The cathode 908 has a cone-like or funnel-like shape as opposed to a ring shape. An illustration is provided in FIG. 9B showing electron paths from the cathode 908 to the anode 902.

FIG. 10 shows a cold cathode X-ray tube 1000 with a different shaped anode, a different shaped cathode, and a different relative anode-cathode position inside a cavity 1014.

The distal end 1004 of anode 1002 is tapered without a pointed tip. Instead, the tapered distal end 1004 has a planar or flat end face 1050. Note that the previous anode tips may have a small planar tip and not be a perfect point as any sharp point in a high voltage region tends to create very high, unwanted EM fields. The central axis 1052 of the anode 1002 and cathode 1008 are vertically aligned with each other (e.g., along the y-axis such that they have the same y-axis value), but not horizontally aligned with each other (e.g., along the x-axis such that they have different x-axis values). As such, the cathode 1008 may be said to be located in front of or after the anode 1002 on in a positive x-axis direction 1054. The planar or flat end face 1050 of the anode 1002 may not be spaced apart in the horizontal direction (e.g., the x-direction) from the cathode 1008. Cathode 1008 comprise an annulus with a center opening 1058 in which the planar or flat end face 1050 resides. The present solution is not limited in this regard. For example, the cathode 1008 may be a planar or flat plate or piece with a circular perimeter shape, which is offset or spaced apart from planar or flat end face 1050 in either direction 1054 and 1056. An illustration is provided in FIG. 10B showing electron paths from the cathode 1008 to the anode 1002.

FIG. 11 shows a cold cathode X-ray tube 1100 with a different shaped anode, a different shaped cathode, and a different relative anode-cathode position inside a cavity 1114.

The distal end 1104 has a shaped end face 1150. The end face 1150 is concave or otherwise bends in direction 1156 away from the cathode 1108. The central axis 1152 of the anode 1102 and cathode 1108 are vertically aligned with each other (e.g., along the y-axis such that they have the same y-axis value), but not horizontally aligned with each other (e.g., along the x-axis such that they have different x-axis values). As such, the cathode 1108 may be said to be located in front of or after the anode 1102 on in a positive x-axis direction 1154. The planar or flat end face 1150 of the anode 1102 is spaced apart from the cathode 1108 by a distance $D_{AC}$. The cathode 1108 comprises a first portion 1160 with a cone- or funnel-like shape having a width W1 that increases in direction 1154 and a second portion 1162 with a cone- or funnel-like shape having a width W2 that increases in opposing direction 1156. An illustration is provided in FIG. 11B showing electron paths from the cathode 1108 to the anode 1102.

Figure 12:
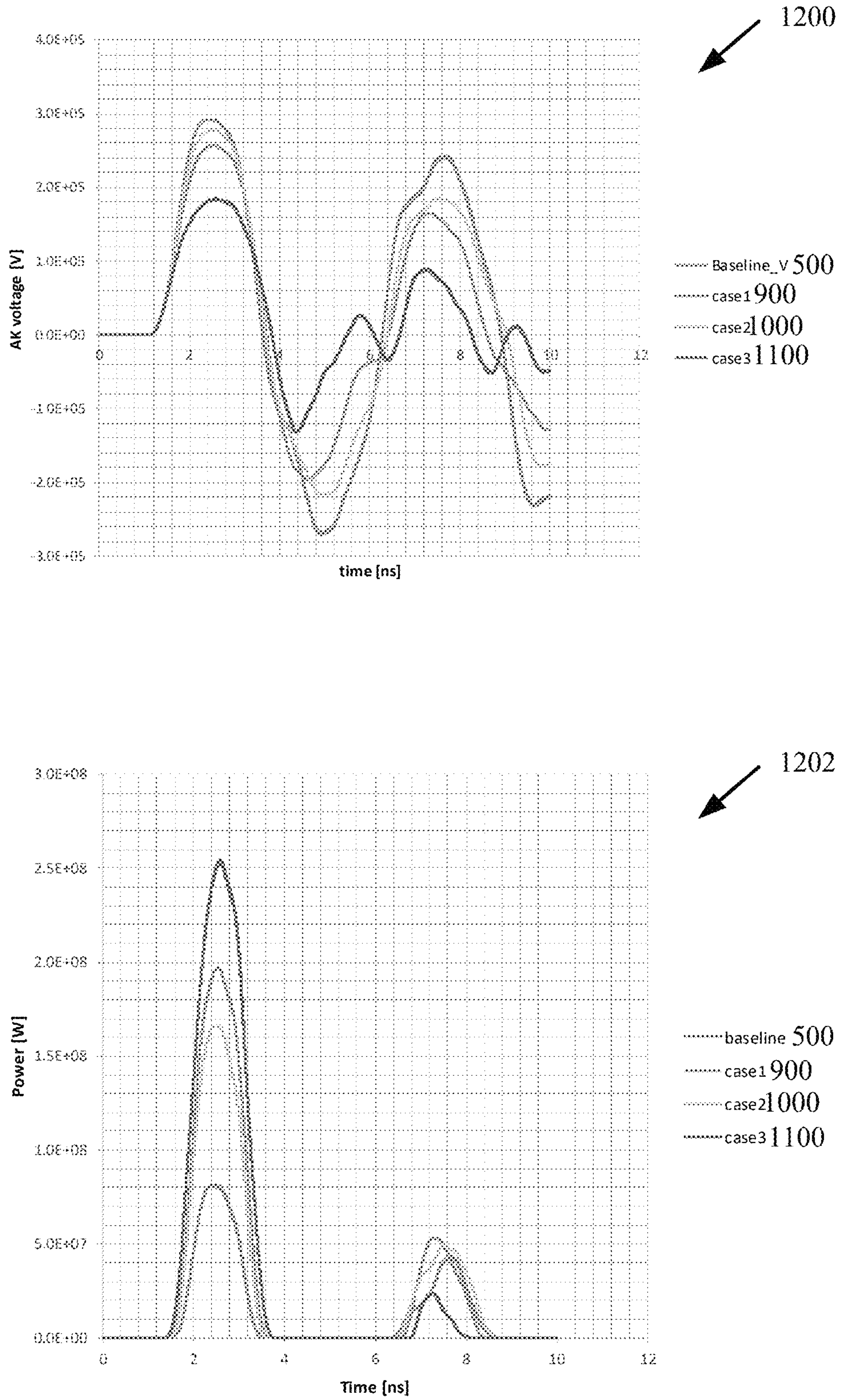
FIG. 12 provides graphs that are useful for understanding an inverse correlation of anode-cathode voltage to power.

FIG. 12 provides a graph 1200 plotting AK voltage of cold cathode X-ray tubes 500, 900, 1000, 1100 versus time in nanoseconds and a graph 1202 plotting power of cold cathode X-ray tubes 500, 900, 1000, 1100 versus time in nanoseconds. As shown by these two graphs 1200, 1202 there is an inverse correlation between AK voltage to power.

Figure 13:
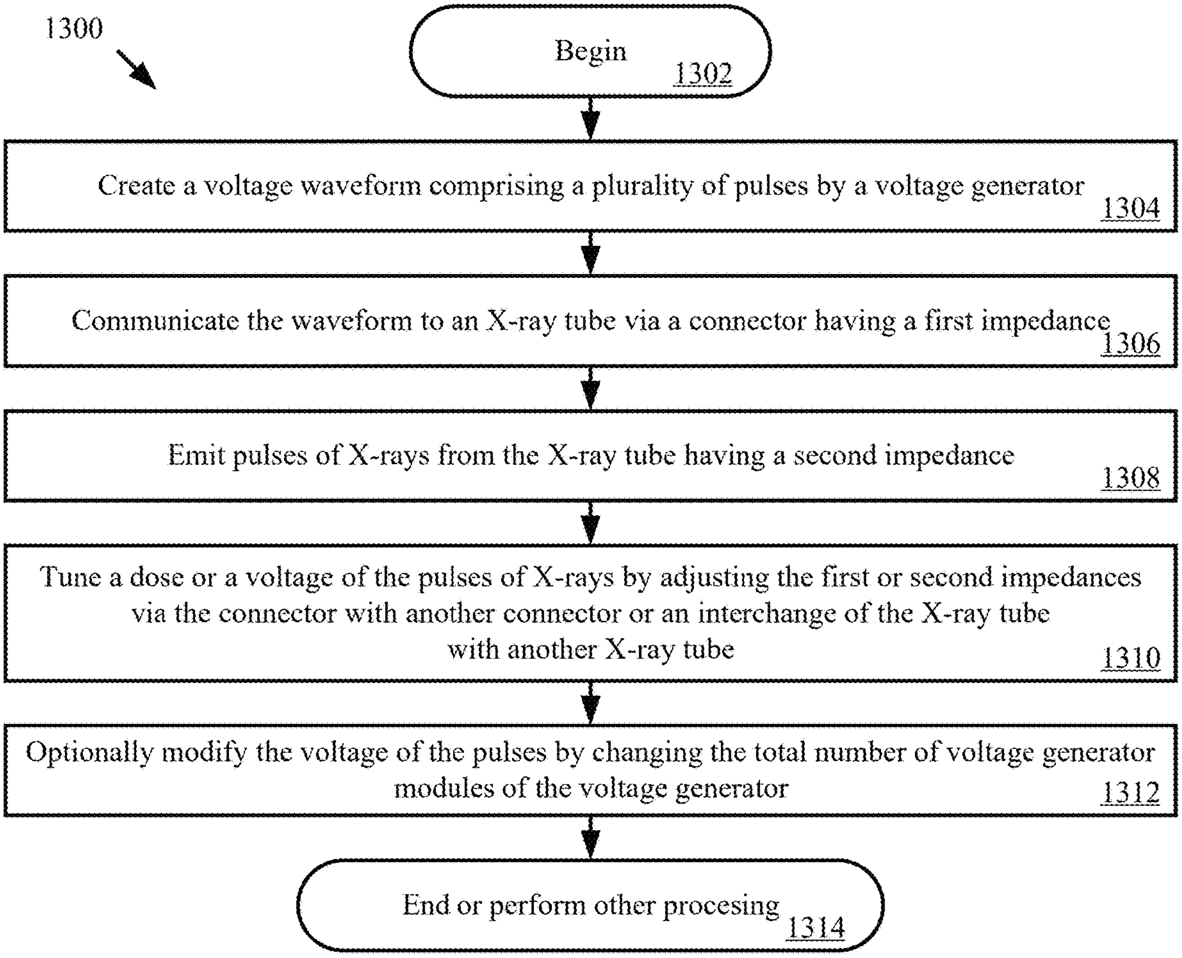
FIG. 13 provides a flow diagram of an illustrative method for generating X-rays and/or operating a system to generate X-rays.

FIG. 13 provides a flow diagram of an illustrative method 1300 for generating X-rays and/or operating a system (e.g., system 100 of FIG. 1) to generate X-rays. Method 1300 begins with 1302 and continues with 1304 where a voltage waveform is created by a voltage generator (e.g., voltage generator(s) 1-2 of FIG. 1). The waveform comprises a plurality of pulses. The pulses may be equal to or less than ten nanoseconds in length. The waveform is communicated to an X-ray tube (e.g., X-ray tube 104 of FIG. 1) via a connector (e.g., connector 114 of FIG. 1) having a first impedance (e.g. impedance $Z_L$ of FIG. 1), as shown by block 1306.

Responsive to the waveform, pulses of X-rays (e.g., X-rays 122 of FIG. 1) are emitted from the X-ray tube in block 1308. The X-ray tube has a second impedance (e.g. impedance $Z_T$ of FIG. 1). In block 1310, a dose or a voltage of the pulses of X-rays is tuned by adjusting the first and/or second impedances via the connector with another connector or an interchange of the X-ray tube with another X-ray tube. The X-ray tube and the another X-ray tube may have different anode diameters, different anode distal ends shapes, different anode taper angles, different anode tapered shapes, different anode lengths, different anode materials, different total number of cathodes, different cathode shapes, different cathode sizes, different cathode inner ring shapes, different cathode thicknesses, different anode-cathode gaps, and/or different cathode-anode angles.

The tuning of block 1310 may include, but is not limited to: removing an end cap of a housing; removing an insulator material from the housing that was surrounding the X-ray tube; pulling the X-ray tube in a direction away from the voltage generator, whereby the connector disconnects from the voltage generator; disconnecting the X-ray tube from the connector; creating a new tube-connector assembly by connecting the another X-ray tube to the connector; pushing the new tube-connector assembly in an opposing direction towards the voltage generator until an electrical connection is provided between the voltage generator and the new tube-connector assembly; inserting the new tube-connector assembly into the housing; disposing the insulator material around the X-ray tube; and/or re-installing the end cap of the housing.

The voltage generator may have a modular design in which a plurality of voltage generator modules may be added to the system to increase the voltage of the pulses or removed from the system to decrease the voltage of the pulses. In this case, method 1300 may optionally have a block 1312 in which the voltage of the pulses is modified by changing the total number of voltage generator modules of the voltage generator. Subsequent to completing the operations of block 1310 and/or 1312, method 1300 continues to block 1314 where it ends or other operations are performed (e.g., return to 1302).

The present solution can be implemented using hardware and/or software. In this regard, the present solution can include, but is not limited to, a computer system, a hardware system, a programmable logic array (PLA), or other electronic circuit.

Figure 14:
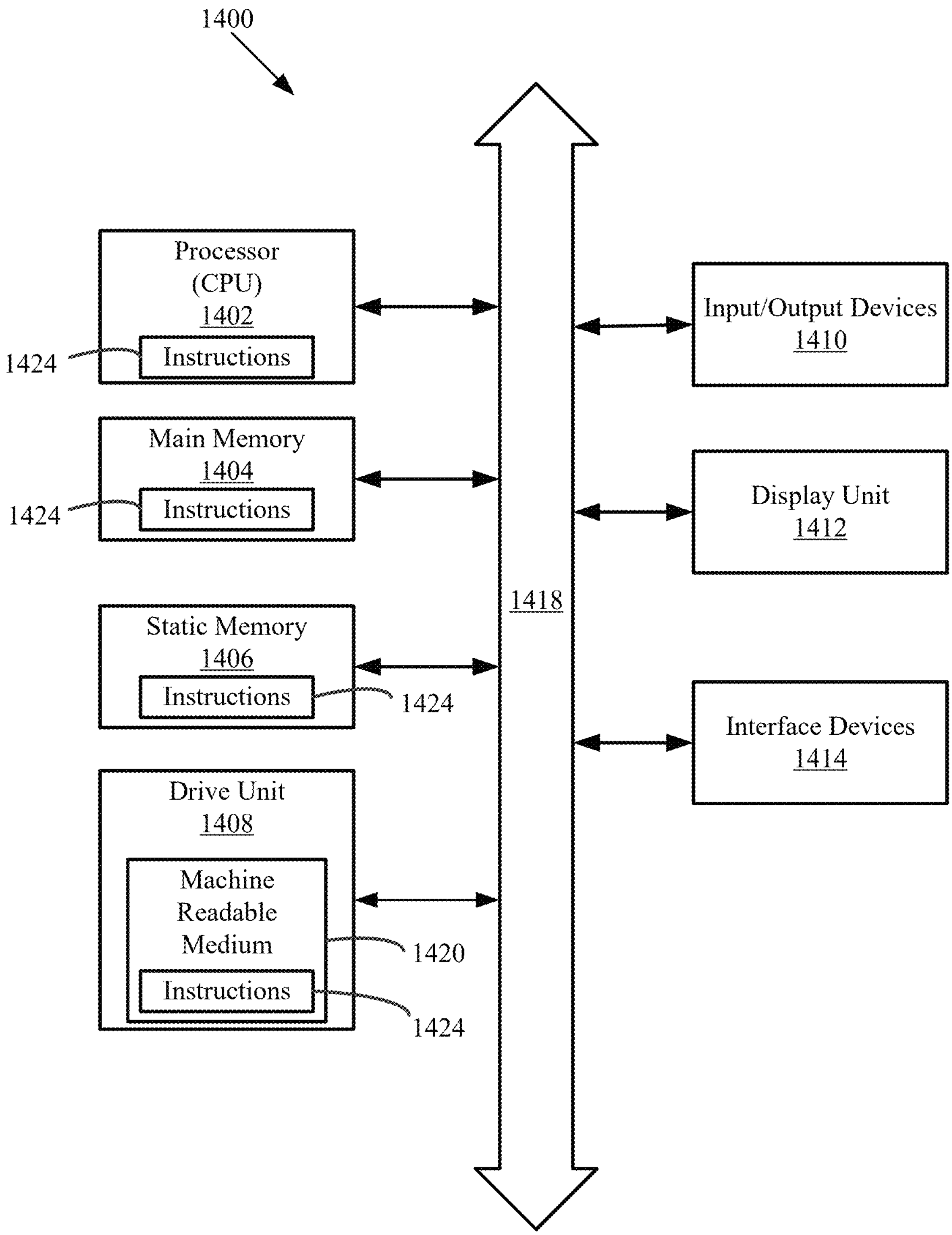
FIG. 14 provides an illustration of a computer system.

FIG. 14 provides an illustration of a hardware block diagram for a computer system 1400 that can be used for implementing all or part of computing device 130 of FIG. 1. The machine can include a set of instructions which are used to cause the circuit/computer system to perform any one or more of the methodologies discussed herein. While only a single machine is illustrated in FIG. 14, it should be understood that in other scenarios the system can be taken to involve any collection of machines that individually or jointly execute one or more sets of instructions as described herein.

The computer system 1400 is comprised of a processor 1402 (e.g., a central processing unit (CPU)), a main memory 1404, a static memory 1406, a drive unit 1408 for mass data storage and comprised of machine readable media 1420, input/output devices 1410, a display unit 1412 (e.g., a liquid crystal display (LCD) or a solid state display, and one or more interface devices 1414. Communications among these various components can be facilitated by means of a data bus 1418. One or more sets of instructions 1424 can be stored completely or partially in one or more of the main memory 1404, static memory 1406, and drive unit 1408.

The instructions can also reside within the processor 1402 during execution thereof by the computer system. The input/output devices 1410 can include a keyboard, a multi-touch surface (e.g., a touchscreen) and so on. The interface device(s) 1414 can be comprised of hardware components and software or firmware to facilitate an interface to external circuitry. For example, in some scenarios, the interface devices 1414 can include one or more analog-to-digital (A/D) converters, digital-to-analog (D/A) converters, input voltage buffers, output voltage buffers, voltage drivers and/or comparators. These components are wired to allow the computer system to interpret signal inputs received from external circuitry, and generate the necessary control signals for certain operations described herein.

The drive unit 1408 can comprise a machine readable medium 1420 on which is stored one or more sets of instructions 1424 (e.g., software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include solid-state memories, electrically erasable programmable read-only memory (EEPROM) and flash memory devices. A tangible medium as described herein is one that is non-transitory insofar as it does not involve a propagating signal.

Computer system 1400 should be understood to be one possible example of a computer system which can be used in connection with the various implementations disclosed herein. However, the systems and methods disclosed herein are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems broadly include a variety of electronic and computer systems. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein.

Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

As evident from the above discussion, the present solution concerns an X-ray source. The X-ray source is configured to generate a relatively short voltage pulse (~1 ns or <10 ns) and implement a transmission line with characteristics that may be varied to allow for the selective tuning on the resulting X-ray. The application of the relatively short voltage pulse as it is applied to a cold cathode X-ray tube allows for a single pulse generator to use different X-ray tubes to accomplish a wide variety of different goals as defined by: dose rate, X-ray voltage (keV), and/or spot size. This is accomplished using a system that has a relatively longer MTTF than existing systems. The novel system also has a longer lifetime of the X-ray tubes than conventional X-ray tubes since the relatively short pulses (approximately 1 ns or <2 ns) facilitates a significant decrease in anode erosion over a given period of time.

The novel system comprises: a voltage generator configured to create a waveform comprising one or more pulses; a plurality of X-ray tubes that are each configured to emit pulses of X-rays responsive to the waveform; and a plurality of connectors that are each configured to be coupled to the voltage generator and communicate the waveform from the voltage generator to the X-ray tube. The dose and voltage of the pulses of X-rays is tunable in the field by adjusting at least one of (i) a line impedance of the system via an interchange of a first connector with another second connector of the plurality of connectors and (ii) a load impedance of the system via an interchange of a first X-ray tube with another second X-ray tube of the plurality of X-ray tubes.

The pulses may be equal to or less than five nanoseconds in length. The first X-ray tube and the second X-ray tube may have different anode diameters, different anode distal ends shapes, different anode taper angles, different anode tapered shapes, different anode lengths, different anode materials, different total number of cathodes, different cathode shapes, different cathode sizes, different cathode inner ring shapes, different cathode thicknesses, different anode-cathode gaps, or different cathode-anode angles.

Each of the X-ray tubes may comprise cathode(s) and an elongate anode located adjacent to the cathode(s). In the case that a plurality of cold cathodes are provided the cathodes may be equally or unequally spaced apart relative to a tip of the elongate anode and a point on the elongate anode where a distal end portion begins or a taper of the elongate anode begins.

In some scenarios, the cathode(s) may have a ring shape with a center aperture through which a distal end of the elongate anode is placed. The elongate anode may have a tapered distal end that is at least partially encompassed by the ring shaped cathode. The cathode(s) may alternatively or additionally have a cone-like shape with a smallest diameter located closest to the elongate anode. A center axis of the cone-like shaped cathode(s) may be aligned with a center axis of the elongate anode. The cone-like shaped cathode may be disposed in front of an end face of the elongate anode. The end-face of the elongate anode may be planar, flat, concave or bent.

In those or other scenarios, one or more of the cathodes comprise: a first portion having a cone-like shape with a smallest diameter located closest to the elongate anode; and a second portion coupled to the first portion and having a cone-like shape with a largest diameter located closest to the elongate anode. Note that a single cone version of the anode may be provided.

In those or other scenarios, the voltage generator comprises a modular design in which a plurality of voltage generator modules may be added to the system to increase the voltage of the pulses or removed from the system to decrease the voltage of the pulses.

Each connector may comprise: a proximal end member sized and shaped to facilitate an electrical connection between the voltage generator and the connector; a distal end member configured to provide a particular value for the line impedance and prevent formation of an electrical arc between the connector and an anode of an X-ray tube or the plurality of X-ray tubes that is in use; and an elongate conductive member extending through both the proximal and distal end members and providing a path for the waveform to travel from the voltage generator to the anode. The elongate conductive member may comprise a varying diameter with a first portion having a smaller diameter being disposed in the proximal end member of the connector and a second portion having a larger diameter being partially disposed in the distal end member of the connector. The proximal end member of the connector may comprise an internal conductive material encompassing the first portion of the elongate conductive member. The connector may further comprise an electrical resistive material encompassing the second portion that is disposed in the distal end member of the connector. The electrical resistive material can include, but is not limited to, silicone.

The distal end member of the connector may comprise an external shaped surface that faces the X-ray tube, and is sized and shaped to provide a minimized distance between the connector and the X-ray tube and prevent an electrical arc from being formed between the connector and the X-ray tube. The minimized distance may be a variable distance that is largest at an outer edge of the external shaped surface and smallest at a center of the external shaped surface.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form “a”, “an”, and “the” include plural references unless the context clearly dictates otherwise. Unless defined otherwise, all technical and scientific terms used herein have the same meanings as commonly understood by one of ordinary skill in the art. As used in this document, the term “comprising” means “including, but not limited to”.

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

What is claimed is:

1. A system, comprising:

a voltage generator configured to create a waveform comprising a plurality of pulses;

a plurality of X-ray tubes that are each configured to emit pulses of X-rays responsive to the waveform; and a plurality of connectors that are each configured to be coupled to the voltage generator and communicate the waveform from the voltage generator to the X-ray tube;

wherein the dose or voltage of the pulses of X-rays is tunable in the field by adjusting at least one of (i) a line impedance of the system via an interchange of a first connector with another second connector of the plurality of connectors and (ii) a load impedance of the system via an interchange of a first X-ray tube with a second X-ray tube of the plurality of X-ray tubes.

2. The system according to claim 1, wherein the first X-ray tube and the second X-ray tube have different anode diameters, different anode distal ends shapes, different anode taper angles, different anode tapered shapes, different anode lengths, different anode materials, different total number of cathodes, different cathode shapes, different cathode sizes, different cathode inner ring shapes, different cathode thicknesses, different anode-cathode gaps, or different cathode-anode angles.

3. The system according to claim 1, wherein each of the plurality of X-ray tubes comprises at least one cathode and an elongate anode located adjacent to at least one cathode.

4. The system according to claim 3, wherein the at least one cold cathode has a ring shape with a center aperture through which a distal end of the elongate anode is proximal.

5. The system according to claim 3, wherein the elongate anode has a tapered distal end that is at least partially encompassed by the at least one cathode.

6. The system according to claim 3, wherein the at least one of the plurality of X-ray tubes comprises a plurality of cathodes that are equally or unequally spaced apart relative to a tip of the elongate anode and a point on the elongate anode where an optional tapered distal end begins.

7. The system according to claim 3, wherein at least one cathode has a cone-like shape with a smallest diameter located closest to the elongate anode.

8. The system according to claim 7, wherein a center axis of the at least one cathode is aligned with a center axis of the elongate anode, and the at least one cathode being disposed in front of a planar or flat end face of the elongate anode.

9. The system according to claim 3, wherein at least one cathode comprises:

a first portion having a cone-like shape with a smallest diameter located closest to the elongate anode; and a second portion coupled to the first portion and having a cone-like shape with a largest diameter located closest to the elongate anode.

10. The system according to claim 3, wherein the elongate anode comprises a distal end with a concave or convex end face.

11. The system according to claim 1, wherein the plurality of pulses are equal to or less than five nanoseconds in length.

12. The system according to claim 1, wherein the voltage generator comprises a modular design in which a plurality of voltage generator modules may be added to the system through a use of a plurality of connectors to increase the voltage of the pulses or removed from the system to decrease the voltage of the pulses.

13. The system according to claim 1, wherein each connector of the plurality of connectors comprises:

a proximal end member sized and shaped to facilitate an electrical connection between the voltage generator and the connector;

a distal end member configured to provide a particular value for the line impedance and prevent formation of an electrical arc between the connector and an anode of an X-ray tube or the plurality of X-ray tubes that is in use; and an elongate conductive member extending through both the proximal and distal end members and providing a path for the waveform to travel from the voltage generator to the anode.

14. The system according to claim 12, wherein the elongate conductive member has a varying diameter with a first portion having a smaller diameter being disposed in the proximal end member of the connector and a second portion having a larger diameter being partially disposed in the distal end member of the connector.

15. The system according to claim 13, wherein the proximal end member of the connector comprises an internal conductive material encompassing the first portion of the elongate conductive member.

16. The system according to claim 13, wherein the connector further comprises an electrically resistive material encompassing the second portion that is disposed in the distal end member of the connector.

17. The system according to claim 15, wherein the electrical resistive material comprises silicone.

18. The system according to claim 13, wherein the distal end member of the connector comprises an external shaped surface that faces the X-ray tube, and is sized and shaped to provide a minimized distance between the connector and the X-ray tube and prevent an electrical arc from being formed between the connector and the X-ray tube.

19. The system according to claim 17, wherein the minimized distance is a variable distance that is largest at an outer edge of the external shaped surface and smallest at a center of the external shaped surface.

20. A method for operating a system to generate X-rays in the field, comprising:

generating a waveform comprising a plurality of pulses by a voltage generator;

communicating the waveform to an X-ray tube via a connector having a first impedance;

responsive to the waveform, emitting pulses of X-rays from the X-ray tube having a second impedance; and tuning a dose and/or a voltage of X-rays by adjusting the first or second impedances via the connector with another connector or an interchange of the X-ray tube with another X-ray tube.

21. The method according to claim 19, wherein the X-ray tube and the another X-ray tube have different anode diameters, different anode distal ends shapes, different anode taper angles, different anode tapered shapes, different anode lengths, different anode materials, different total number of cathodes, different cathode shapes, different cathode sizes, different cathode inner ring shapes, different cathode thicknesses, different anode-cathode gaps, or different cathode-anode angles.

22. The method according to claim 19, wherein the plurality of pulses are equal to or less than five nanoseconds in length.

23. The method according to claim 19, wherein the voltage generator comprises a modular design in which a plurality of voltage generator modules may be added to the system to increase the voltage of the pulses or removed from the system to decrease the voltage of the pulses.

24. The method according to claim 19, further comprising modifying the voltage of the pulses by changing the total number of voltage generator modules of the voltage generator.

25. The method according to claim 19, wherein the tuning comprises:

pulling the X-ray tube in a direction away from the voltage generator, whereby the connector disconnects from the voltage generator;

disconnecting the X-ray tube from the connector;

creating a new tube-connector assembly by connecting the another X-ray tube to the connector, connecting the another connector to the X-ray tube, or connecting the another X-ray tube to the another connector; and pushing the new tube-connector assembly in an opposing direction towards the voltage generator until an electrical connection is provided between the voltage generator and the new tube-connector assembly.

26. The method according to claim 24, further comprising:

removing an end cap of a housing; and removing a material from the housing that was surrounding the X-ray tube, prior to pulling the X-ray tube in the direction away from the voltage generator.

27. The method according to claim 25, further comprising performing the following step pushing the new tube-connector assembly in an opposing direction towards the voltage generator:

inserting the new tube-connector assembly into the housing; and disposing the insulator material around the X-ray tube.

* * * * *